Jan. 26, 1937.     J. C. OLSEN     2,069,111
BELT END FASTENER
Filed April 24, 1936
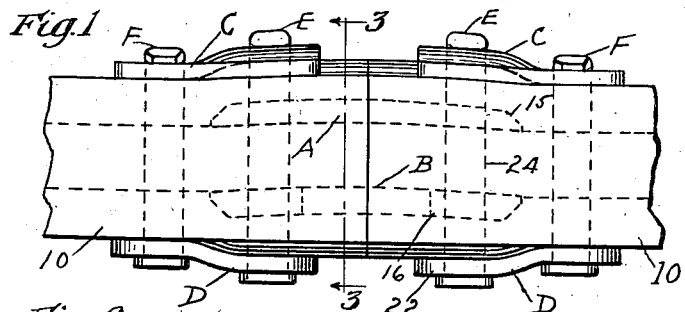
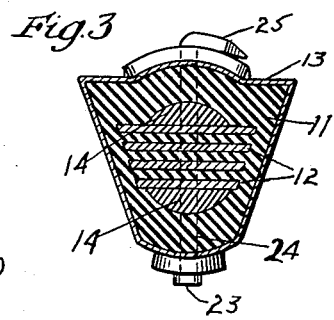
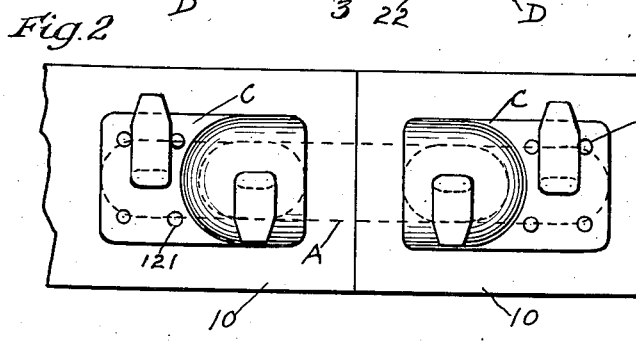
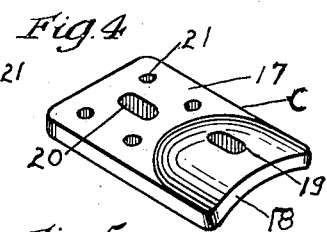
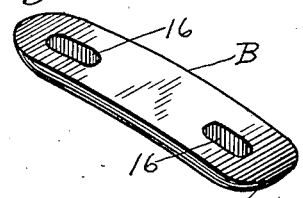
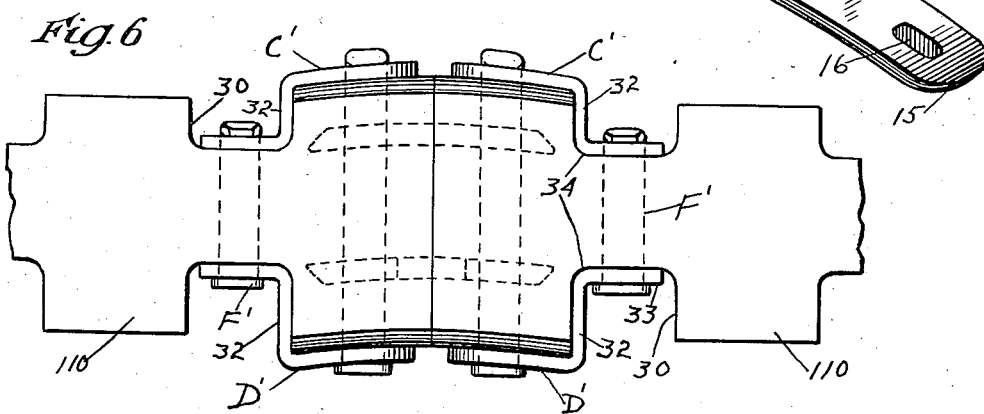
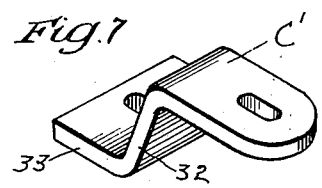
Inventor
John C. Olsen
By Joseph Harris
his Atty.

Patented Jan. 26, 1937

2,069,111

UNITED STATES PATENT OFFICE 2,069,111

BELT END FASTENER

John C. Olsen, Chicago, Ill., assignor to Flexible Steel Lacing Company, Chicago, Ill., a corporation of Illinois Application April 24, 1936, Serial No. 76,138

13 Claims. (Cl. 24—31)

This invention relates to improvements in belt end fastener and more especially such a fastener particularly designed for uniting the ends of side driving or V-belts.

One object of the invention is to provide a fastener for belt ends wherein the connecting means proper extending from one belt end to the other, are embedded within the belt material and in such manner as to avoid weakening of the material or tensile strength of the belt at the joint.

Another object of the invention is to provide a fastener of relatively rigid type for V-belts wherein the fastener includes connecting rigid links so arranged that the links are disposed within the belt material, the links being of such construction that the effective distance between the side driving faces of the belt is not appreciably increased by the embedded links, whereby neither the efficiency nor the life of the belt will be lessened.

A further object of the invention is to provide a fastener of the type outlined in the preceding paragraphs such that, notwithstanding the relative rigidity thereof, ample provision is made in the arrangement to allow of the desirable flexing of the connected ends of the belt while passing over the pulleys to thereby conform thereto.

Other objects of the invention pertaining to desirable details of construction, economy of manufacture and efficiency will clearly appear from the description hereinafter following taken in connection with the drawing.

In the drawing forming a part of this specification, Figure 1 is a side elevation of the adjacent ends of a V-belt showing the improvements in connection therewith. Figure 2 is a top plan of the structure shown in Figure 1. Figure 3 is a vertical or radial cross section corresponding to the line 3—3 of Figure 1. Figures 4 and 5 are detail perspectives of one of the clamping plates and one of the rigid connecting links, respectively. Figure 6 is a view similar to Figure 1 showing the improvements as applied to a notched V-belt. And Figure 7 is a detail perspective of the modified form of clamp plate employed in the Figure 6 construction.

Referring first to the construction illustrated in Figures 1 to 5 inclusive, 10—10 denotes the adjacent ends of a V-belt of well known construction, the ends thereof being cut off square and butted as clearly shown in Figures 1 and 2. The improved connecting means comprise, broadly, an upper rigid link A; a lower connecting link B; a pair of upper or outer clamping plates C—C; a pair of lower or inner clamping plates D—D; a pair of fastening elements or pins E—E; and an additional set of retainer elements or pins F—F.

In V or side driving belts of the character shown in the drawing, it is customary to form the same of a main body of resilient material such as rubber 11 with an embedded series of layers or plies of fabric 12—12, the latter being located in the zone of the neutral axis of the belt and constituting the main tension transmitting portion of the belt. As also customary, the belt is encased with a fabric layer 13, vulcanized to the main body of the belt.

In carrying out the invention, each end of the belt is slitted lengthwise thereof by a suitably designed tool, preferably immediately above and below the fabric layers 12—12, said slits being extended into the belt material a distance corresponding to one-half the length of the links A and B and of a width corresponding to the latter. By means of the slits so formed, none of the material of the belt is removed nor is the strength of the main tension transmitting portion of the belt lessened, nor are the slits extended to the side driving faces of the belt, thus leaving said side faces intact and without decreasing the strength or life of the belt. Further, in preparing the belt ends, the same are punched or slit radially by a suitably designed tool, for the reception of the respective fastening elements E and F.

The links A and B are of generally similar construction and each composed of suitable metal, such as steel, and of such width and thickness, as to provide the necessary stiffness. Referring to the upper link A, the same is of segmental cross section as indicated at 14 in Fig. 3 with the flat side lying against the fabric layer and the rounded side opposite thereto. At each end, the link A is rounded off as indicated at 15, so as to facilitate the insertion of the link within the previously prepared slit within the belt material. The link A is further provided, near each end thereof, with a suitable slot to receive the shanks of the pins E—E therethrough. It will be noticed also, from Figure 1, that the link A is slightly curved lengthwise about a center below the belt, as viewed in Figure 1, so as to more readily accommodate the belt when passing over the pulleys.

The lower link B is similar to the upper link A except that it is reversely disposed, that is, with its arcuate surface extending downwardly or radially inwardly of the belt. Another slight difference in the link B resides in the provision of the slots 16—16 which accommodate the pins E, said slots 16 being somewhat elongated and with a normal clearance between the pins E and the adjacent ends of the slots 16 on the side toward the butted ends of the belt, for the purpose hereinafter described.

With the construction of the links A and B, as shown and described, embedded in the belt material, it is evident that there is no appreciable increase produced in the distance between the side driving faces of the belt. On the contrary, the displacement of the belt material necessitated by the insertion of the links, is produced radially outward or upward by the upper link A and oppositely or downwardly and inwardly by the lower link B, thus causing somewhat rounded bulges on the radially outer and inner, nondriving faces of the belt. In this manner, the efficiency of the belt as a driving medium is not militated against in any way.

The upper clamping plates C, one on each belt end, preferably each comprise a flat section 17 at the end remote from the butted ends of the belt, and an arcuate or rounded section 18 at its other end to accommodate the bulge in the belt material, heretofore referred to. Each of said plates C is also suitably slotted as indicated at 19 and 20 to receive the shanks of the fastening pins E and F, respectively. In addition, each plate C may be provided with a plurality of small holes 21—21 to receive a plurality of small brads 121 entered therethrough into the belt material and having a friction driving fit within the holes 21, so as to augment the connection between the plates and the belt.

The lower clamping plates D are similar to the upper plate C except that they are appreciably narrower because disposed on the narrow inner face of the belt. In case of each link D, the end thereof nearest the butted ends of the belt is downwardly offset slightly, as indicated at 22, to accommodate for the bulge in the material where the plate D overlaps the end of the link.

The fastening elements or pins E, are each preferably in the form of a heavy pin having a head 23, a flat shank 24 and a pointed bendable end 25. The shanks 24, which are entered radially through the belt material and the corresponding slots of the links A and B, are so disposed that their greatest dimension extends lengthwise of the belt and, correspondingly, the shorter dimension transversely of the belt, so as to minimize any tendency of the pins to swell or increase the width of the belt.

The other set of retaining elements or pins F, are similar in construction to the pins E, except that they are somewhat shorter and are extended radially through the belt and the flat ends of the plates C and D, as clearly shown in Figure 1. Preferably all of the pins E and F are entered from the lower or inner side of the belt and have their tapered ends suitably bent over to retain the pins and hold plates snugly in position, as shown best in Figures 2 and 3. When the belt is in service and running over pulleys, the belt necessarily flexes or bends in going around the pulleys which is accommodated in part by the curvature of the rigid links A and B, hereinbefore referred to. Further flexing of the belt material is accommodated by reason of the elongated slots 16 in the lower or inner link B, since the pins E may move toward each other within the slots 16 while passing over the pulleys, it being understood that the material of the belt will compress somewhat due to its resilient nature, causing a slight crowding of the material at the butted joint on the inner or lower side thereof. As soon as the belt passes off of the pulley onto the tangent, the portions of the belt adjacent the connected ends thereof will straighten out, this action being accommodated by the pins E moving away from each other.

With a fastener of the type shown and described, an exceedingly strong connection is obtained capable of sustaining great tension without tearing out of the belt and, as previously described, the links are preferably so disposed as not to weaken the fabric layers in the belt. It will be noted also that the retaining elements or pins E and F can be disposed at a relatively remote distance from the butted ends of the belt, which further minimizes any tendency for such pins to pull out. Another important feature resides in the fact that there are no rocking pins or other like elements such as heretofore deemed necessary and which are subject to excessive wear and, obviously, the belt ends can be very easily prepared for the reception of the fastener.

Referring now to the construction shown in Figures 6 and 7, the belt there indicated at 110 is of the double notched type such as now frequently used. The fastener is substantially the same as that previously described, except that the clamping plates $C^1$ and $D^1$ are modified to extend into the endmost notches 30 and 31 of the belt ends. For this purpose, each of said plates is provided with a radially extending section 32 fitting snugly against the radial walls of the endmost lugs and another end flange section 33 fitting snugly against the bottom of the endmost notches 30 and 31 and through which is received the remote connecting element or pin $F^1$. With this construction of clamping plates $C^1$ and $D^1$, fitted into the corners of the end notches, the material of the endmost lugs of the belt is firmly held and danger of flexing and tearing out at the corners indicated at 34, such as existed in previous types of fasteners for notched belt ends, is minimized and substantially eliminated. Stated otherwise, the flexing of the notched V-belt incident to passing over the pulleys is, with the improved fastener herein shown and described thrown back to points substantially in line with the second lugs from the butted ends of the belt.

From the preceding description, it will be seen that all of the parts of the improved fastener are of simple construction; the same may be made in quantity at relatively small expense; and the application of the parts to the belt is a comparatively simple and easy matter.

Although there has herein been shown and described what is now considered the preferable manner of carrying out the invention, the same is by way of illustration only and not by way of limitation, all changes and modifications being contemplated that come within the scope of the claims appended hereto.

What is claimed is:

1. The combination with adjacent ends of a belt; of means for connecting said ends including: a plurality of rigid links having their respective ends extended within the material of the belt ends, said links being spaced radially of the belt and curved lengthwise thereof to adapt the belt to conform to the pulleys; and securing elements extending radially of the belt through the respective belt ends and embedded ends of the links, certain of said elements and links being so connected to allow of slight circumferential play therebetween in compensating for the difference in tension and compression between the outer and inner portions of the belt material while passing over the pulleys.

2. The combination with adjacent butted ends of a V-belt comprised of resilient material with an embedded layer of fabric in the zone of the neutral axis thereof; of means for connecting said ends including: a pair of rigid links having their ends extended within the belt ends radially outwardly and inwardly of said fabric layer to thereby avoid weakening of the latter; and securing elements extending radially of the belt through the respective belt ends and embedded ends of the links.

3. An article of manufacture in accordance with claim 2 wherein each link is rounded on that side remote from the fabric layer.

4. An article of manufacture in accordance with claim 2, wherein the width of the links is less than the width of the inner face of the V-belt and the slits in the belt ends to accommodate the embedded link ends are of substantially the same width as the links whereby to avoid extending the slits to and weakening the driving sides of the belt.

5. The combination with adjacent ends of a V-belt; of means for connecting said ends including: a pair of rigid links having their ends extended within the material of the belt ends; a pair of inner and outer plates on each belt end; a securing element extending radially through each belt end, the respective embedded link ends and pair of plates; and an additional securing element extended radially through each belt end and respective pair of plates.

6. The combination with adjacent ends of a V-belt; of a rigid link extending from one belt end to the other and having its ends embedded in the respective belt ends, said link being of lesser width than the width of the belt in that plane; a pair of retainer plates on the inner and outer faces of each belt end; a securing pin extending through each pair of plates and respective embedded link end; and an additional securing element extending radially through each pair of plates and belt end at a point circumferentially spaced from the end of the link.

7. A fastener for V-belts comprising: a pair of circumferentially extending links adapted to have their ends embedded in adjacent ends of a belt; two pairs of clamping plates, each pair being adapted to be mounted on the inner and outer faces of a belt end and partially overlapping the respective ends of the links; and a pair of securing pins for each pair of plates, one of said pins being adapted to extend through the respective link ends and the other through the plates and belt only.

8. A fastener in accordance with claim 7 wherein said links are longitudinally curved and one of said links is adapted for slight circumferential movement with respect to the pins extended therethrough, said pins being relatively narrow in cross section transversely of the belt and elongated circumferentially of the belt.

9. In a fastener for V-belt ends, the combination with a connector link of substantial and rigid construction adapted to bridge the joint between the ends of the belt and having its ends extended within the material of the belt ends; of attaching plates adapted to be secured to the belt ends in engagement with the outer and inner surfaces thereof; and pins, spaced inwardly from said joint between the ends of the belt and extending respectively radially through the material at opposite ends of the belt, said pins having engagement with said link adjacent its ends and with said plates.

10. In a fastener for V-belt ends, the combination with a connector link of substantial and rigid construction adapted to extend from within the material of one belt end into the material of the other belt end; of a pair of pins, adapted to be disposed radially of the belt, said pins each having engagement with opposite ends of the link within the material of the corresponding belt end; and means on each belt end with which said pins have engagement for transmitting pulling loads thereto.

11. A V-belt fastener in accordance with claim 10, wherein a limited amount of lost motion is provided between the link ends and said pins.

12. A V-belt fastener in accordance with claim 10, wherein said link is curved lengthwise to adapt the fastener to conform to pulleys.

13. In a fastener for the ends of a V-belt, the combination with a pair of rigid links spaced radially of the belt and arranged to extend circumferentially of the belt across the ends thereof, the inner of said links having its ends extended within the material of the belt ends; of means on each belt end engageable with the inner and outer surfaces thereof; fastening elements for attaching said means to the respective belt ends; and radially disposed elements having engagement with the respective sets of ends of said links and with said means for transferring the pulling loads from said links to said means.

JOHN C. OLSEN.